United States Patent [19]
Lee

[11] Patent Number: 6,018,610
[45] Date of Patent: Jan. 25, 2000

[54] VIDEO CASSETTE RECORDER RECORD COMPENSATION APPARATUS

[75] Inventor: Jong-keun Lee, Seoul, Rep. of Korea

[73] Assignee: Samsung Electronics Co., Ltd., Kyungki-Do, Rep. of Korea

[21] Appl. No.: 08/975,677

[22] Filed: Nov. 21, 1997

[30] Foreign Application Priority Data

Dec. 17, 1996 [KR] Rep. of Korea ............... 96-66944

[51] Int. Cl.⁷ .................................................. H04N 5/76
[52] U.S. Cl. .......................................... 386/46; 386/93
[58] Field of Search ................................ 386/46, 67, 93, 386/9, 10; 360/137; H04N 5/76

[56] References Cited

U.S. PATENT DOCUMENTS

| | | | |
|---|---|---|---|
| 4,280,159 | 7/1981 | Nakayama | 360/137 |
| 4,533,961 | 8/1985 | Shibata et al. | 386/10 |
| 4,644,436 | 2/1987 | Unno | 360/137 |
| 4,989,112 | 1/1991 | Hamoda | 360/137 |
| 5,311,373 | 5/1994 | Murabayashi et al. | 386/46 |
| 5,400,149 | 3/1995 | Minakawa | 386/93 |
| 5,740,309 | 4/1998 | Miimura | 386/93 |
| 5,937,135 | 8/1999 | Kim et al. | 386/46 |

*Primary Examiner*—Huy Nguyen
*Attorney, Agent, or Firm*—Sughrue, Mion, Zinn, Macpeak & Seas, PLLC

[57] ABSTRACT

A video cassette recorder (VCR) record compensation apparatus that provides an optimal record environment based on the record time of the tape. This apparatus includes a record amplifier which controls the amplitude of a video signal to be recorded via a head based on the record time of the tape, to prevent the image quality from deteriorating due to magnetization characteristics of the tape. Also included is a record equalizer, which compensates the frequency characteristics of the video signal to be recorded based on the full record time of the tape.

10 Claims, 2 Drawing Sheets

VIDEO CASSETTE RECORDER RECORD COMPENSATION APPARATUS

BACKGROUND OF THE INVENTION

1. Field of the Invention

The present invention relates to a video cassette recorder (VCR), and more particularly, to a record compensation apparatus which provides an optimal record environment based on the length of the video tape.

2. Description of Related Art

General video tape is classified into types T-30, T-60, T-120, and T-180, where the number indicates the maximum recording time at normal recording speed. In a conventional VCR, the record current and frequency compensation band are fixed regardless of the type of tape. Therefore, for some types of tape, the quality of the image deteriorates or a black-and-white inversion phenomenon occurs.

SUMMARY OF THE INVENTION

To partly solve the above problems, an object of the present invention is to provide a VCR record compensation apparatus that provides an optimal recording environment depending on the type of tape.

To accomplish the above object, a VCR record compensation apparatus according to the present invention comprises a record amplifier which controls the magnitude of a video signal to be recorded by a head, based on the length of the recording tape.

The record amplifier sets an amplification factor to be higher for tapes with longer recording times, in order to maintain high image quality between tapes having different magnetization characteristics.

Also, it is preferable to further include a record equalizer which compensates the frequency characteristics of the video signal to be recorded, based on the type of the recording tape.

The record equalizer emphasizes a higher frequency component of a video signal for tapes with longer recording times, thus preventing black-and-white inversion from occurring on a screen during playback due to the magnetization characteristics of the tape.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

Figure 1:
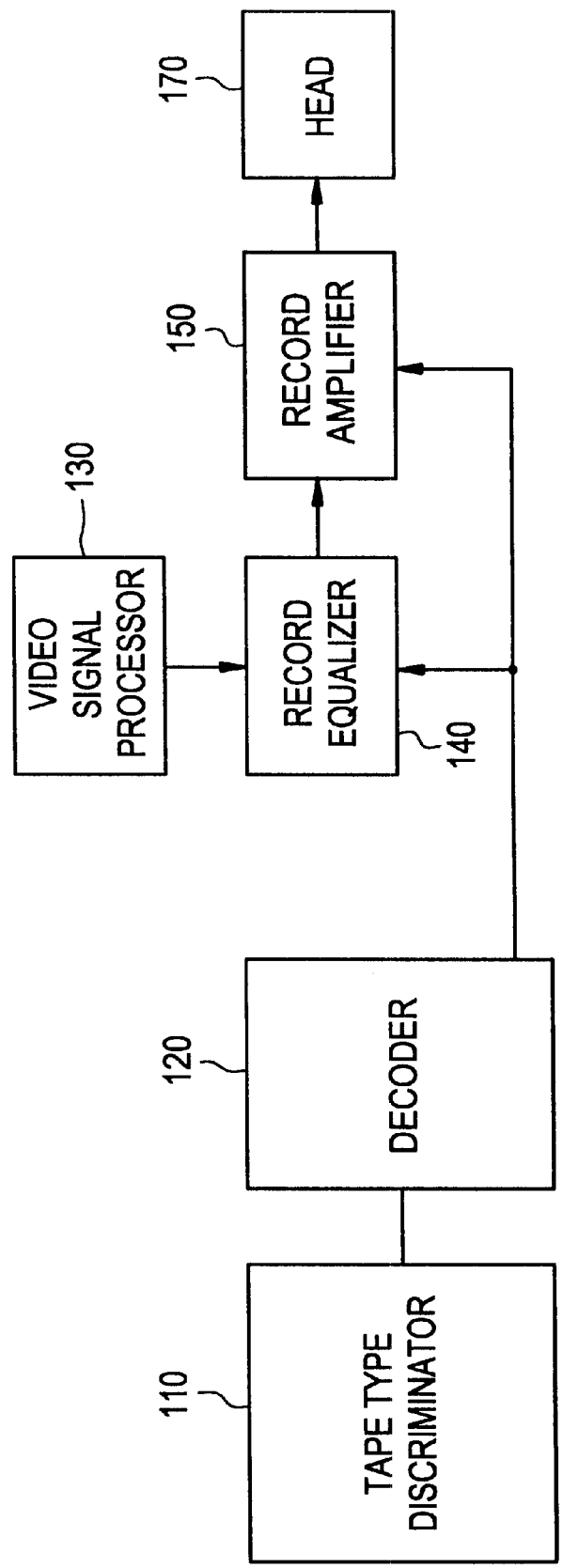
FIG. 1 is a block diagram showing the configuration of a VCR record compensation apparatus according to the present invention.

Referring to FIG. 1, a record compensation apparatus according to the present invention includes a tape type discriminator 110, a decoder 120, a video signal processor 130, a record equalizer 140, and a record amplifier 150. Tape type discriminator 110 detects the type of tape. Decoder 120 generates a decoded digital signal of a predetermined number of bits depending on the type of tape detected by tape type discriminator 110. Video signal processor 130 processes a video signal. Record equalizer 140 equalizes the frequency components of the video signal output by video signal processor 130, based on the digital signal generated by decoder 120. Record amplifier 150 changes an amplification factor of the video signal provided by record equalizer 140, based on the digital signal provided by decoder 120, and provides on amplified video signal to head 170.

Tape type discriminator 110 receives a supply reel sense signal and a take-up reel sense signal and detects the type of tape. For example, it detects whether the loaded tape is type T-30, T-60, T-120 or T-180.

Decoder 120 decodes the detected type of tape and generates a 3-bit digital signal. Decoder 120, for example, generates a digital signal "000" when the loaded tape is type T-30, and a digital signal "001" when the loaded tape is type T-60.

Record equalizer 140 compensates for the frequency components of the video signal provided by the video signal processor 130, based on the digital signal provided by decoder 120. Specifically, record equalizer 140 compensates for the high frequency components of the video signal as the record time of the tape is longer.

Record amplifier 150 changes an amplification factor of the video signal provided by record equalizer 140, based on the digital signal provided by decoder 120, amplifies the video signal based on the changed amplification factor, and provides the amplified video signal to head 170.

Figure 2:
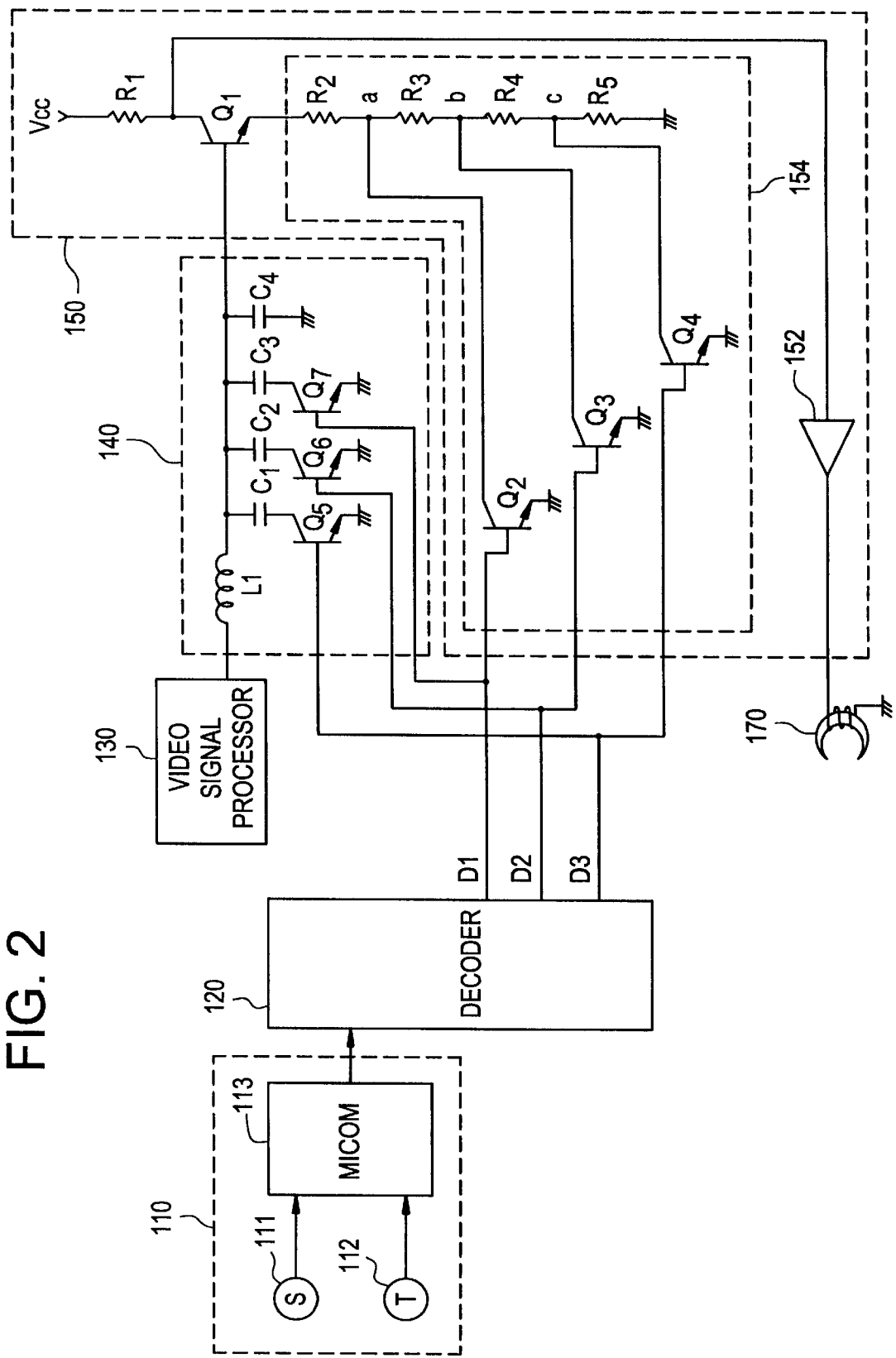
FIG. 2 is a block diagram showing the detailed configuration of the apparatus shown in FIG. 1.

FIG. 2 is a block diagram showing the detailed configuration of the apparatus shown in FIG. 1. Referring to FIG. 2, tape type discriminator 110 includes a supply reel sensor (S) 111, a take-up reel sensor (T) 112, and a microcomputer (MICOM) 113. Supply reel sensor 111 generates a supply reel sense signal, and take-up reel sensor 112 generates a take-up reel sense signal. Microcomputer 113 determines the type of tape by using the sense signals generated by the two sensors 111 and 112, and outputs a tape type discrimination signal.

Decoder 120 decodes the tape type discrimination signal output by microcomputer 113 of tape type discriminator 110, and outputs a 3-bit digital signal "$D_1D_2D_3$". Here, $D_1$ is the most significant bit, and $D_3$ is the least significant bit.

Record equalizer 140 is comprised of a coil L1, four capacitors C1, C2, C3 and C4 and three switching devices Q5, Q6 and Q7. One end of coil L1 is connected to the output of video signal processor 130. One end of each of capacitors C1, C2, C3 and C4 is connected to the other end of coil L1. The other end of capacitor C4 is connected to ground. Switching devices Q5, Q6 and Q7 are connected between the other ends of capacitors C1, C2 and C3, respectively, and ground, and are switched in response to the digital signal output by decoder 120.

Record amplifier 150 includes a transistor Q1, a variable resistance unit 154, and a buffer 152. Transistor Q1 has its base connected to the output of record equalizer 140, its collector connected to a power supply voltage Vcc via a resistor R1, and its emitter connected to ground via variable resistance unit 154. Buffer 152 buffers an amplified video signal output at the collector of transistor Q1, and supplies the buffered video signal to head 170.

Variable resistance unit 154 includes four resistors R2, R3, R4 and R5 connected to each other in series, and three switching devices Q2, Q3 and Q4 installed between the respective junction points between the resistors and ground and receiving each bit of the 3-bit digital signal via the respective bases thereof.

The operation of the apparatus shown in FIG. 2 will now be described in detail.

When a tape is loaded and travels in a VCR, supply and take-up reel sensors 111 and 112 generate a supply reel sense signal and a take-up reel sense signal, respectively. Microcomputer 113 receives the supply and take-up reel sense signals and detects the amount of wound tape. Microcomputer 113 determines the type of tape classified by the record time, e.g., T-30, T-60, T-120 or T-180, and outputs a discrimination signal corresponding to the current tape type. Decoder 120 decodes the discrimination signal generated by microcomputer 113 and generates the 3-bit digital signal "$D_1D_2D_3$". Record amplifier 150 varies an amplification factor based on the digital signal "$D_1D_2D_3$" provided by decoder 120, amplifies the video signal provided by record equalizer 140, and provides the amplified video signal to head 170.

As the length of tape becomes longer, magnetization characteristics of the tape deteriorate. To prevent this problem, record current should be increased.

The amplifying operation of record amplifier 150 will now be described in detail. For example, when a video signal is recorded on a T-30 tape, decoder 120 outputs a digital signal having a value "000". Transistors Q2, Q3 and Q4 do not conduct in response to this digital signal. Therefore, the amplification factor of transistor Q1 is confined to its lowest value.

When a video signal is recorded on a T-60 tape, the decoder 120 outputs a digital signal having a value "001". In response to this digital signal, transistor Q4 conducts, but transistors Q2 and Q3 do not conduct. Therefore, the amplification factor of the transistor Q1 is made higher than in the case of the T-30 tape based on variation of the combined resistance.

Record equalizer 140 varies the frequency compensation band of the video signal provided by video signal processor 130, according to the digital signal "$D_1D_2D_3$" provided by decoder 120, and supplies the compensated video signal to record amplifier 150.

As the length of tape becomes longer, magnetization characteristics of the tape degrade. When a tape having degraded magnetization characteristics is played back, black-and-white inversion can occur on a screen. Therefore, a high band component must be compensated for.

Next, the equalization of record equalizer 140 will be described in more detail. For example, when a video signal is recorded on a T-30 tape, decoder 120 outputs a digital signal having a value "000". Transistors Q5, Q6 and Q7 do not conduct in response to this digital signal. Therefore, record equalizer 140 compensates for the component of the lowest frequency band.

When a video signal is recorded on a T-60 tape, decoder 120 outputs a digital signal having a value "001". In response to this digital signal, transistor Q5 conducts, but transistors Q6 and Q7 do not conduct. Therefore, record equalizer 140 compensates for the component of a higher frequency band than in the case of the T-30 tape based on the combination of coil L1 and capacitor C1.

According to the record compensation apparatus of the present invention as described above, an optimal record environment is provided depending on the type of tape. Therefore, the image quality is enhanced, and black-and-white inversion can be prevented.

While only certain embodiments of the invention have been specifically described herein, it is apparent that numerous modifications may be made without departing from the spirit and scope of the invention.

What is claimed is:

1. A video tape recorder record compensation apparatus comprising:

a tape type discriminator which receives a supply reel sense signal and a take-up reel sense signal and determines a type of tape depending on the length of the tape; and a record amplifier which controls the amplitude of a video signal to be recorded via a head, based on the type of the tape determined by said tape type discriminator.

2. The video tape recorder record compensation apparatus as claimed in claim 1, wherein said record amplifier comprises:

a transistor having a base to which a video signal to be recorded is applied, and a collector to which said head is connected; and a variable resistance unit which is connected to the emitter of said transistor in which a resistance value is varied according to the type of the tape determined by said tape type discriminator.

3. The video tape recorder record compensation apparatus as claimed in claim 2, further comprising:

a decoder which generates a digital signal of a predetermined number of bits whose value varies with the type of the tape determined by said tape type discriminator, and wherein said variable resistance unit includes a plurality of resistors connected in series, said resistors corresponding to the number of said bits plus one, and a plurality of switching devices which are installed between the connection points between adjacent resistors and a ground electric potential and switched in response to each bit of said digital signal provided by said decoder.

4. The video tape recorder record compensation apparatus as claimed in claim 2, wherein said record amplifier sets an amplification factor to be higher as the length of the tape is longer.

5. The video tape recorder record compensation apparatus as claimed in claim 3, further comprising a record equalizer for compensating for the frequency characteristics of a video signal to be recorded based on the type of tape determined by said tape type discriminator.

6. The video tape recorder record compensation apparatus as claimed in claim 5, wherein said record equalizer comprises:

a coil having one end receiving a video signal, and its other end connected to said record amplifier;

a plurality of capacitors each having one end connected to said other end of said coil; and a plurality of switching devices which are each installed between one of said plurality of capacitors and a ground electric potential, and switched in response to each bit of said digital signal provided by said decoder.

7. The video tape recorder record compensation apparatus as claimed in claim 6, wherein said record equalizer emphasizes a higher frequency component of a video signal as the record time of a tape increases.

8. The video tape recorder record compensation apparatus as claimed in claim 1, further comprising a record equalizer for compensating the frequency characteristics of a video signal to be recorded in accordance with the type of tape determined by said tape type discriminator.

9. The video tape recorder record compensation apparatus as claimed in claim 8, further comprising:

a decoder for generating a digital signal of a predetermined number of bits whose value varies with the record time of a tape detected by said tape type discriminator, wherein said record equalizer comprises:

a coil having one end receiving a video signal, and its other end connected to said record amplifier;

a plurality of capacitors each having one end connected to said other end of said coil; and a plurality of switching devices which are each installed between one of said plurality of capacitors and a ground electric potential, and switched in response to each bit of said digital signal provided by said decoder.

10. The video tape recorder record compensation apparatus as claimed in claim 9, wherein said record equalizer emphasizes a higher frequency component of said video signal as the record time of a tape increases.

* * * * *